(12) United States Patent
Williamson (10) Patent No.: US 6,307,649 B1
(45) Date of Patent: Oct. 23, 2001

(54) MOUNTABLE SCANNING DEVICE AND COMPUTER MONITOR INCLUDING SAME

(75) Inventor: James B. Williamson, Sunnyvale, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/244,234

(22) Filed: Feb. 3, 1999

(51) Int. Cl.[7] ................................................... H04N 1/04
(52) U.S. Cl. ............................................. 358/474; 348/823
(58) Field of Search .................................. 348/823, 826, 348/827, 832, 838, 842; 358/474

(56) References Cited

U.S. PATENT DOCUMENTS

| | | | |
|---|---|---|---|
| D. 374,217 | 10/1996 | Wang .................................. D14/100 |
| 3,599,477 | * 8/1971 | Cohen ................................. 73/67.5 R |
| 5,301,043 | * 4/1994 | Ichikawa ............................... 358/498 |
| 5,392,447 | * 2/1995 | Schlack et al. ........................ 395/800 |
| 5,499,108 | * 3/1996 | Cotte ..................................... 358/400 |
| 5,532,825 | 7/1996 | Lim et al. ............................. 358/296 |
| 5,574,497 | * 11/1996 | Henderson ............................. 348/144 |
| 5,582,470 | 12/1996 | Yu ...................................... 312/208.3 |
| 5,748,228 | * 5/1998 | Kobayashi et al. ..................... 348/63 |
| 5,801,851 | 9/1998 | Sheng .................................... 358/497 |
| 5,818,610 | 10/1998 | Bromley et al. ....................... 358/473 |
| 5,822,080 | 10/1998 | Chavez .................................. 358/374 |
| 5,850,296 | 12/1998 | Wang et al. ........................... 358/474 |
| 6,208,437 | * 3/2001 | Neushul ................................ 358/487 |
| 6,254,572 | * 7/2001 | Knipfer et al. ........................ 604/151 |

* cited by examiner

Primary Examiner—Jerome Grant, II

(57) ABSTRACT

A scanner includes a housing defining a front housing opening and, in some instances, a rear housing opening and a movable scanner module located within the housing. The scanner with front and rear housing openings can be mounted on, for example, a computer monitor without obstructing the user's view of the monitor screen.

24 Claims, 9 Drawing Sheets

MOUNTABLE SCANNING DEVICE AND COMPUTER MONITOR INCLUDING SAME

BACKGROUND OF THE INVENTIONS

1. Field of Inventions

The present inventions relate generally to scanners and, more particularly, to flatbed scanners.

2. Description of the Related Art

Desktop computers have become an integral part of most homes and offices. In order to make computers more useful, a wide variety of peripheral devices have been introduced. Peripheral devices, which are specialized devices that are connected to the computer, include CD-ROM drives, printers, audio speakers, and high capacity removable storage devices. Another popular peripheral device is the scanner. Scanners are devices that convert visible images (including text images), such as those found on individual sheets of paper, in photographs, as well as in books and other bound material, into digital data. Some scanners can even be used to generate images of a three dimensional objects.

Peripheral devices must, of course, share valuable desk space with the computer chassis (which includes the CPU) and monitor and other traditional items such as telephones and in/out boxes. This often results in clutter and leaves little to no work space on the desktop. Fortunately, in recent years, many peripheral devices have been incorporated into the computer chassis itself. For example, CD-ROM drives and high capacity removable storage devices are now commonly incorporated into the computer chassis. Speakers are often incorporated into or mounted on the computer monitor. This saves valuable desktop space. One peripheral device that continues to occupy large amounts of desktop space is the scanner and, more specifically, the so-called flatbed scanner.

Generally speaking, there are two types of desktop scanners—sheet feeding scanners and flatbed scanners. Sheet feeding scanners, as the name suggests, are designed to pull (or "feed") a sheet through a housing that includes the image scanning hardware and processing circuitry. The size of sheet feeding scanners has been steadily reduced to the point where sheet feeding scanners occupy a very small portion of the desktop.

Flatbed scanners typically include a relatively large housing and a glass covered opening (or "window") that is at least large enough to allow the placement of an 8.5 inch by 11 inch sheet thereon. The image scanning hardware and processing circuitry are located within housing. After a sheet or other image bearing substrate is placed on the glass, the image is irradiated by a light source. The reflected light sensed by an image sensor that moves past the glass covered opening and the signals generated by the sensor are processed and digitized. Although larger than sheet feeding scanners, flatbed scanners remain popular because, in addition to scanning images on sheets, flatbed scanners are able to scan images found in books and other bound material and generate images of three dimensional objects.

SUMMARY OF THE INVENTIONS

The inventor herein has determined that a need exists for a flatbed scanner which does not occupy as much desktop space as conventional flatbed scanners. Accordingly, one object of the present inventions is to provide a flatbed scanner that occupies less desktop space than conventional flatbed scanners. Another object of the present inventions is to provide a desktop scanner that occupies less desktop space than a conventional scanner with the same window size.

In order to accomplish some of these and other objectives, a scanner in accordance with a preferred embodiment of a present invention includes a housing defining a front housing opening and a rear housing opening and a movable scanner module located within the housing. This combination provides a number of advantages over conventional scanners. For example, the present scanner can be mounted on the front of a computer monitor, thereby saving valuable desktop space, because the scanner housing openings allow the monitor screen to be observed through the scanner.

In order to accomplish some of these and other objectives, a flatbed scanner in accordance with another preferred embodiment of a present invention includes a scanner housing defining an opening, a scanner module, and a mounting device adapted to secure the scanner housing to a vertically extending object in a substantially vertical orientation. This combination provides a number of advantages over conventional flatbed scanners. For example, the present flatbed scanner can be mounted on a monitor, a computer chassis, a wall, or any other suitable structure, thereby saving valuable desktop space.

Accordingly, users of the present inventions will realize the benefits of a flatbed scanner while saving space in a manner heretofore only available with sheet feeding scanners.

The above described and many other features and attendant advantages of the present inventions will become apparent as the inventions become better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. Additionally, its is noted that detailed discussions of various operating components of scanners which are not pertinent to the present inventions, such as image processing and interaction with a host computer, have been omitted for the sake of simplicity.

Figure 1:
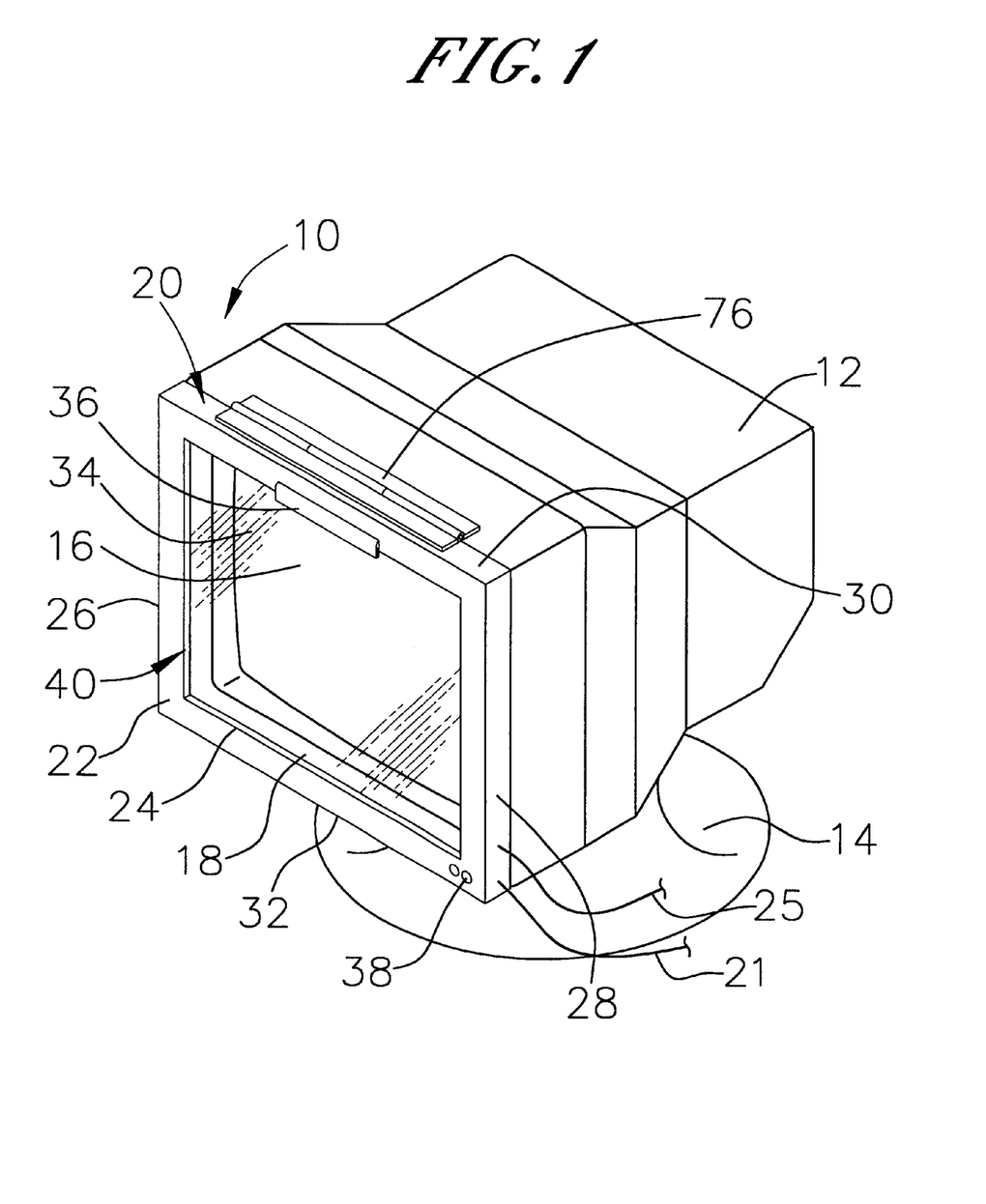
FIG. 1 is a perspective view of a scanner in accordance with a preferred embodiment of a present invention in combination with a monitor.

As illustrated for example in FIG. 1, a scanner 10 in accordance with a preferred embodiment of a present invention may be secured to a monitor such as a computer monitor 12 having a base 14 as well as a monitor screen 16 on the front side 18 on the monitor. The exemplary scanner 10 includes a housing 20 having a front wall 22 with a front opening 24. The housing 20 also includes side walls 26 and 28, a top wall 30 and a bottom wall 32. In the preferred embodiment, there is no rear wall and the rearward ends of the side, top and bottom walls 26–32 together define a rear opening. The rearward ends of the side, top and bottom walls 26–32 also abut the front side 18 of the monitor 12 and may include an elastomeric gasket (not shown). A sheet 34 of glass or any other suitable transparent material is mounted within the opening 24. A clip device for holding an image bearing substrate adjacent the front opening 24 such as, for example, a biased clip 36, is mounted on the front wall 22 of the exemplary scanner 10 and a pair of control buttons 38 are disposed in the front wall.

In an area 40 between the front wall 22 of the scanner housing 20 and the front side 18 of the monitor 12, certain scanning components are located in a concealed manner. That is, certain ones of the scanning components will never be visible when looking straight through the front opening 24, while certain other scanning components will remain out of view until they are actuated and pass by the front opening during a scanning procedure. As a result, a user sitting in front of the monitor 12 will be able to look through the opening 24 and have an unobstructed view of the monitor screen 16 when the scanner 10 is not in use.

It should be noted that a rear wall with an opening, similar to the front wall 22 and opening 24, may be provided, as may a sheet of glass or any other suitable transparent material within the rear opening. The sheet of glass should, however, be contoured to match the contour of the monitor screen 16. The rear wall, which will prevent dust particles from entering the housing, is especially useful in dusty environments because the presence of dust particles on the glass 34 and/or scanning module window So (discussed below with reference to FIG. 3) will adversely affect image scanning quality.

Figure 2:
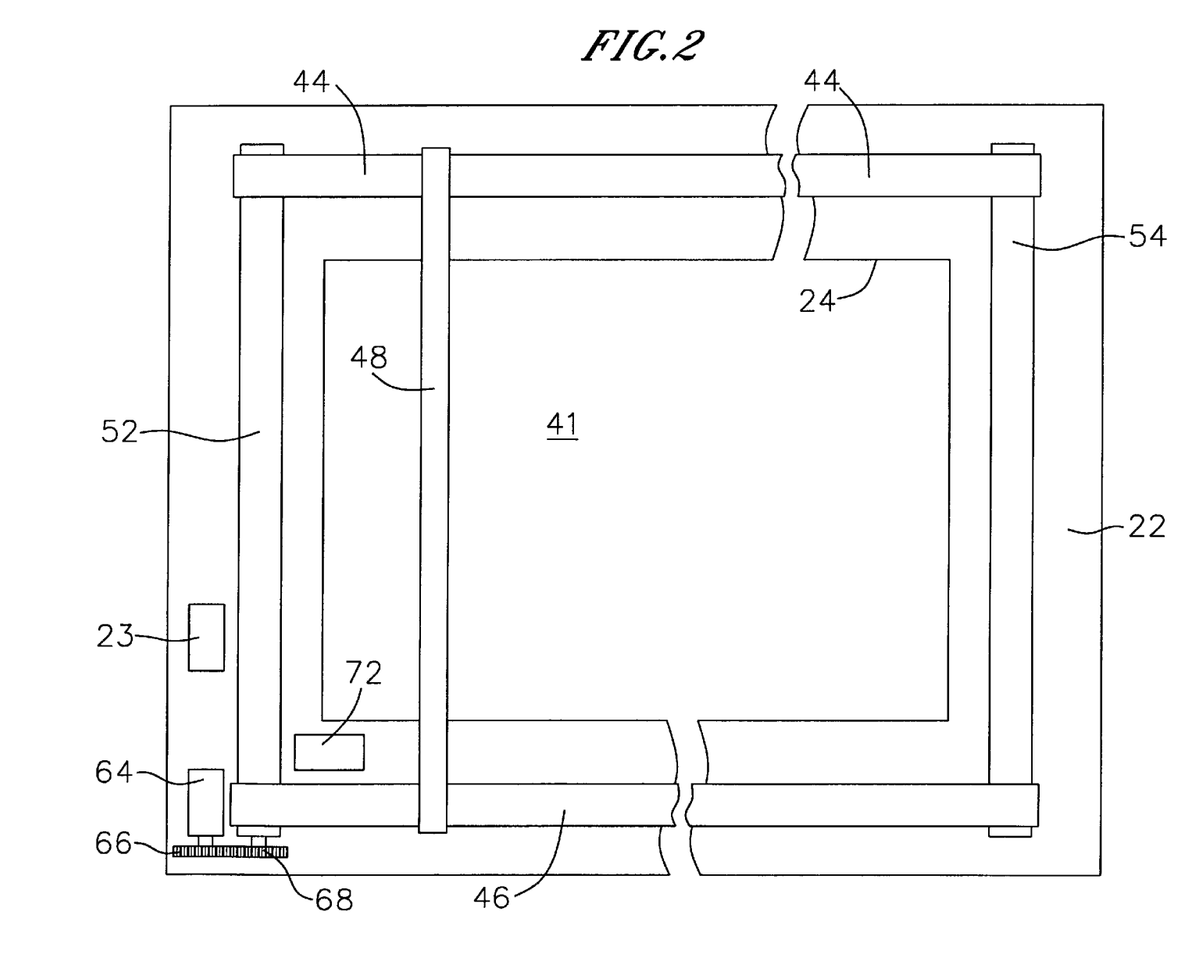
FIG. 2 is a plan view, taken from the rear, of the interior and front wall of the scanner illustrated in FIG. 1.
Figure 3:
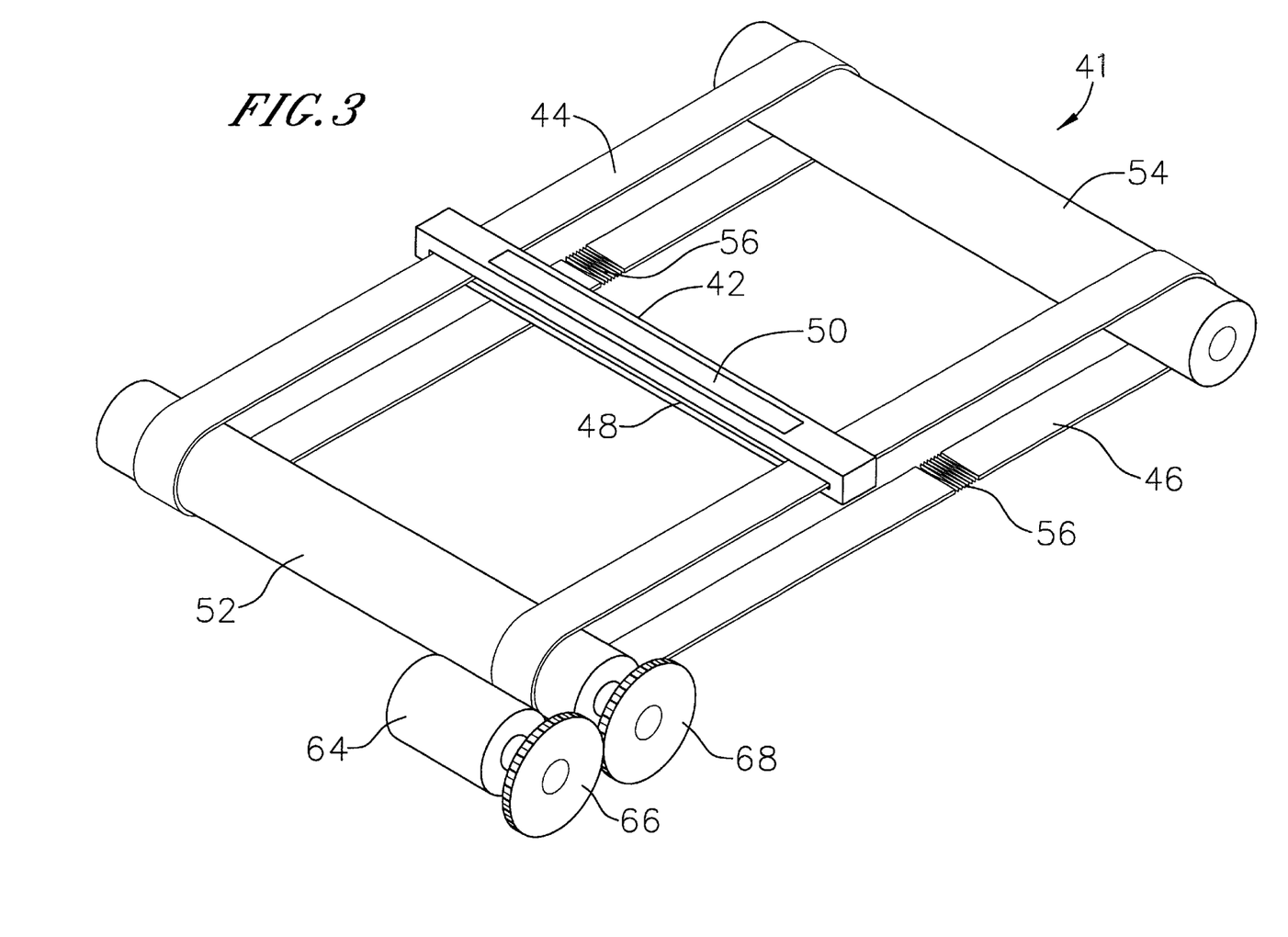
FIG. 3 is a perspective view of a scanner module and drive system in accordance with a preferred embodiment of a present invention.

Referring to FIGS. 2 and 3, the exemplary scanner 10 includes a scanning system 41 having a scanner module 42 that is carried by drive belts 44 and 46. A cross member 48 may be used to augment the connection between the scanner module 42 and the drive belts 44 and 46. The scanner module 42 includes a window 50 and a photoelectric element (not shown). Preferably, the photoelectric element is a conventional contact image sensor (CIS) having a light source, focusing lens and image sensor. A preferred CIS is the IG 3008-FA10A, manufactured by Rohm. Because this type of CIS is relatively flat (about 0.25 to 0.50 inch), the overall thickness of the scanner housing 20 may be kept relatively small. Although not so limited, the thickness of the housing 20 may range from about 1.0 to 4.0 inches and is preferably about 2.0 inches or less. Other photoelectric elements, such as a charge coupled device (CCD), may also be used. Image sensors that do not include their own light source may also be used. Here, the monitor screen 16 would act as the light source.

The drive belts 44 and 46 ride on a pair of belt supporting rollers 52 and 54. A tension spring 56 may also be provided to regulate belt tension. As best seen in FIG. 2, the drive belts 44 and 46 and rollers 52 and 54 are located within the scanner housing 20 such that they will not obscure the view of the monitor screen 16 through the front opening 24.

Figure 4A:
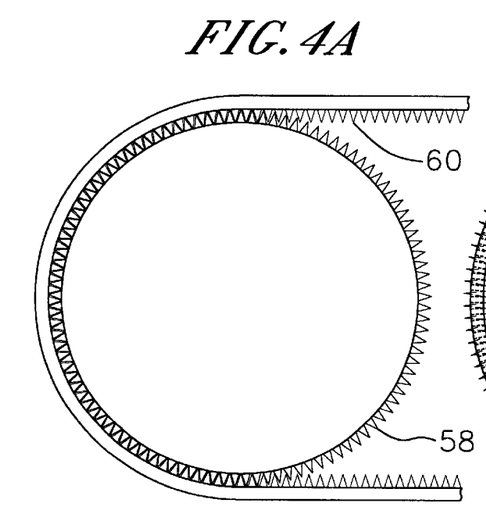
FIG. 4a is a partial side view of an alternate belt and roller arrangement.
Figure 4B:
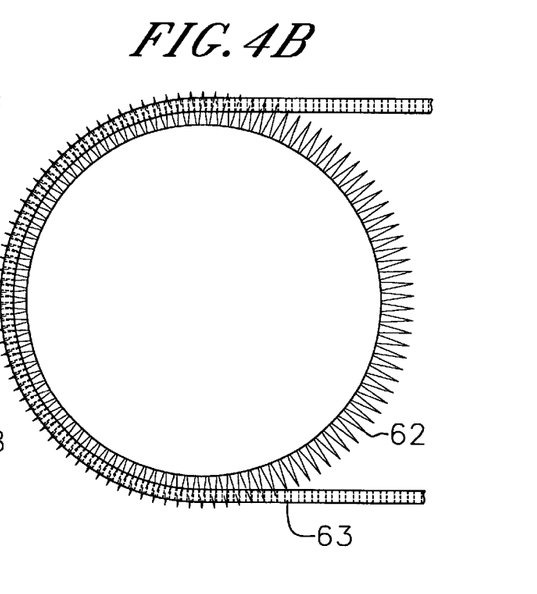
FIG. 4b is a partial side view of another alternate belt and roller arrangement.

In the preferred embodiment illustrated in FIGS. 2 and 3, the belts 44 and 46 are frictionally engaged by the rollers 52 and 54. Nevertheless, in order to reduce belt slippage and improve scanner module tracking, the exemplary drive roller and belt arrangements illustrated in FIGS. 4a and 4b may be employed. Specifically, the rollers may be provided with teeth 58 that are engaged by corresponding teeth 60 the belts (FIG. 4a) or with teeth 62 that mate with holes 63 in the belts (FIG. 4b).

The exemplary scanning system 41 illustrated in FIGS. 2 and 3 also includes a drive motor 64 that is connected to the roller 52 by gears 66 and 68. The drive motor 64 drives the scanner module 42 along a rectilinear path of travel from a rest position adjacent the roller 52, across the front opening 24 and back to the rest position in a manner conventional to flatbed scanners. In this manner, when an image bearing substrate, such as a substrate 70 (FIG. 5), is disposed at the opening 24, the substrate will be scanned in a conventional manner by the scanner module 42.

Operation of the drive motor 64 is controlled by a controller 72. The controller 72 also handles other scanner operations, such as image processing, in a manner well known in the art. The controller 72 is also preferably housed within a shielded enclosure (not shown) that, if necessary, may be located on the exterior of the housing 20.

It should be noted that the exemplary belt and roller arrangement is not the only way to advance the scanner module 42 past the front opening 24. For example, the longitudinal ends of the scanner module 42 may be fitted with sleeves that slide along a track as the scanner module is advanced by a suitable drive mechanism. Other methods of advancing the scanning module 42, such as a single belt and guide arrangement, may also be employed.

Figure 10:
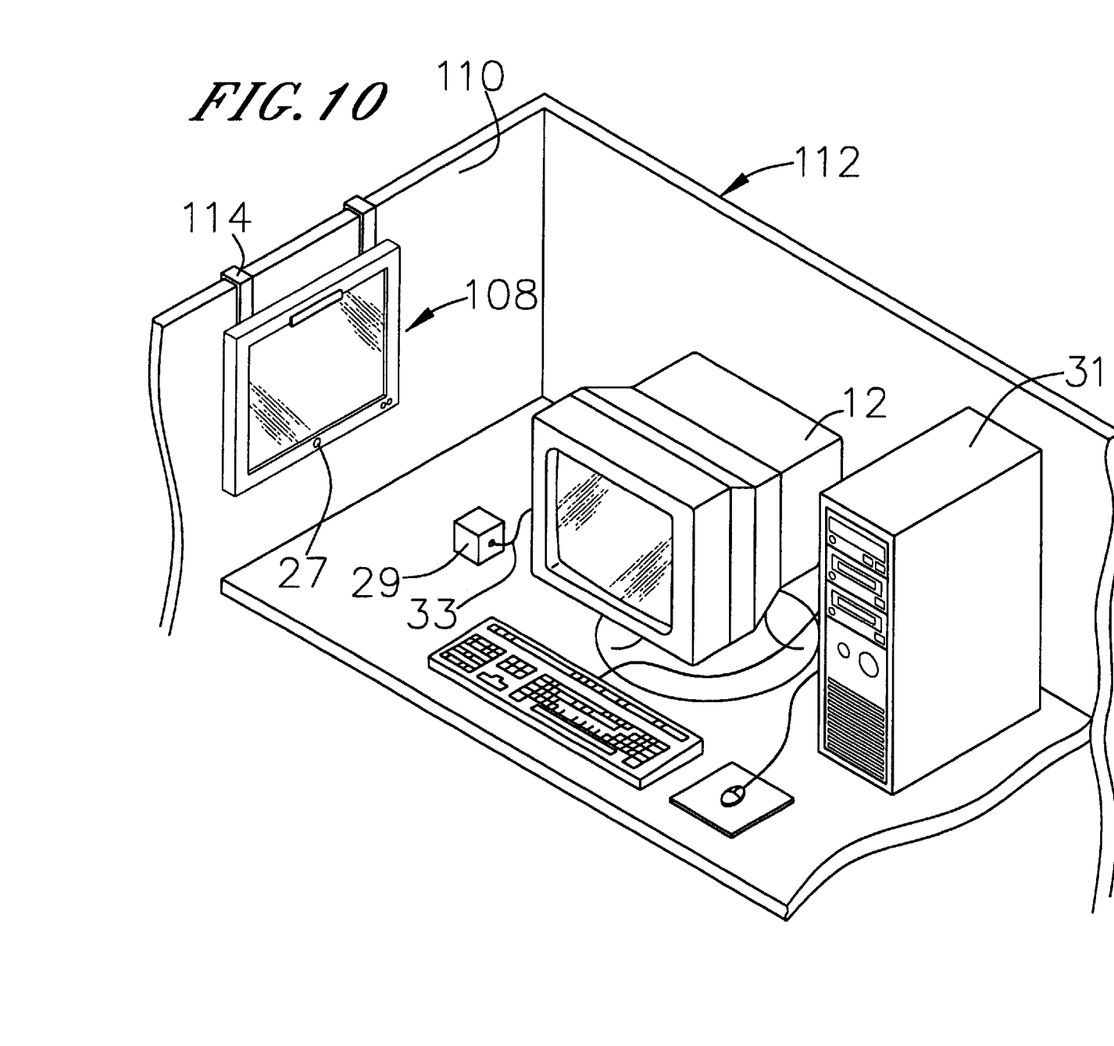
FIG. 10 is a perspective view of a scanner, monitor and computer system in accordance with a preferred embodiment of a present invention mounted on a wall.

As illustrated for example in FIG. 1, the scanner 10 may be connected to a wall outlet by way of a power cord 21, which is connected to the scanner's power supply 23 (FIG. 2). Alternatively, one or more batteries could be used to power the scanner and the housing 20 could include a battery storage area. With respect to data transmission, the scanner 10 may be directly connected to a computer chassis (which includes the CPU) by way of a conventional cable 25. The monitor 12 may also be connected to the computer chassis with a conventional cable. Alternatively, as illustrated in FIG. 10, an infrared transmitter 27 and infrared receiver 29 arrangement may be employed. The infrared receiver 29 is connected to a computer chassis 31 by a cable 33. The cable 33 allows the infrared receiver 29 to be placed at the optimum location relative to the infrared transmitter 27.

Figure 5:
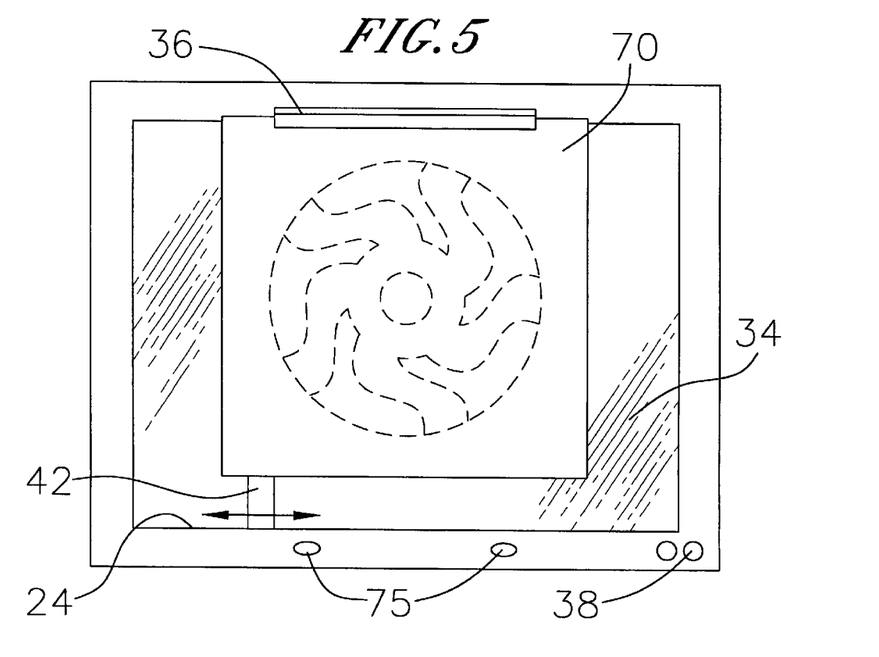
FIG. 5 is a front elevation view of the scanner illustrated in FIG. 1.
Figure 6:
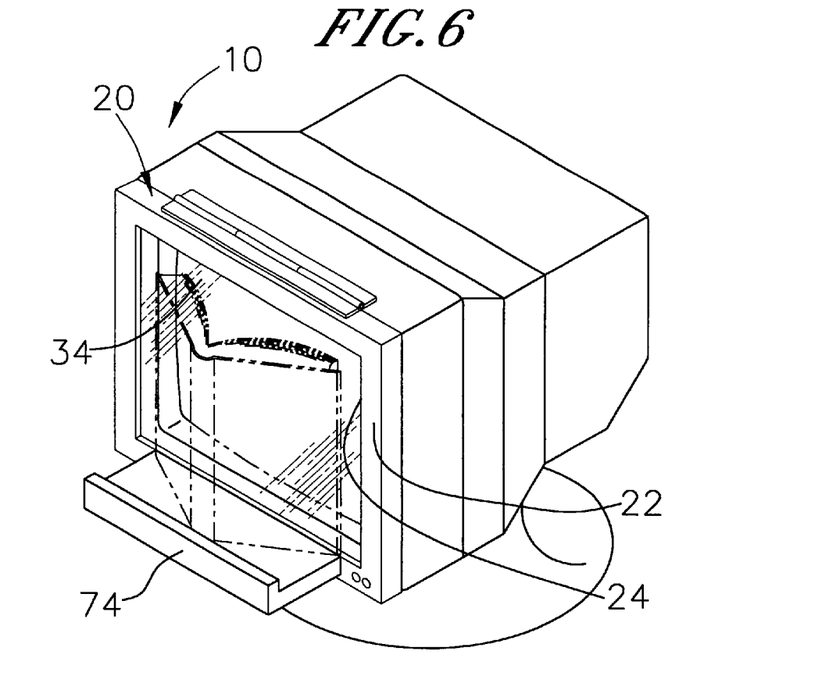
FIG. 6 is a perspective view of a scanner in accordance with a preferred embodiment of a present invention.

As discussed above with reference to FIGS. 1 and 5, a biased clip 36 may be used to hold the image bearing substrate 70 adjacent to the front opening 24. Turning to FIG. 6, a shelf 74 may also be provided to support books or other three-dimensional objects adjacent to the front opening 24. The shelf 74 may be integral with the housing 20, temporarily secured with a mounting hook (on the shelf) and apertures (in the housing) arrangement, or slidable in and out of the housing between an extend use position and a retracted storage position. Suitable mounting apertures 75 are illustrated in FIG. 5.

Figure 7:
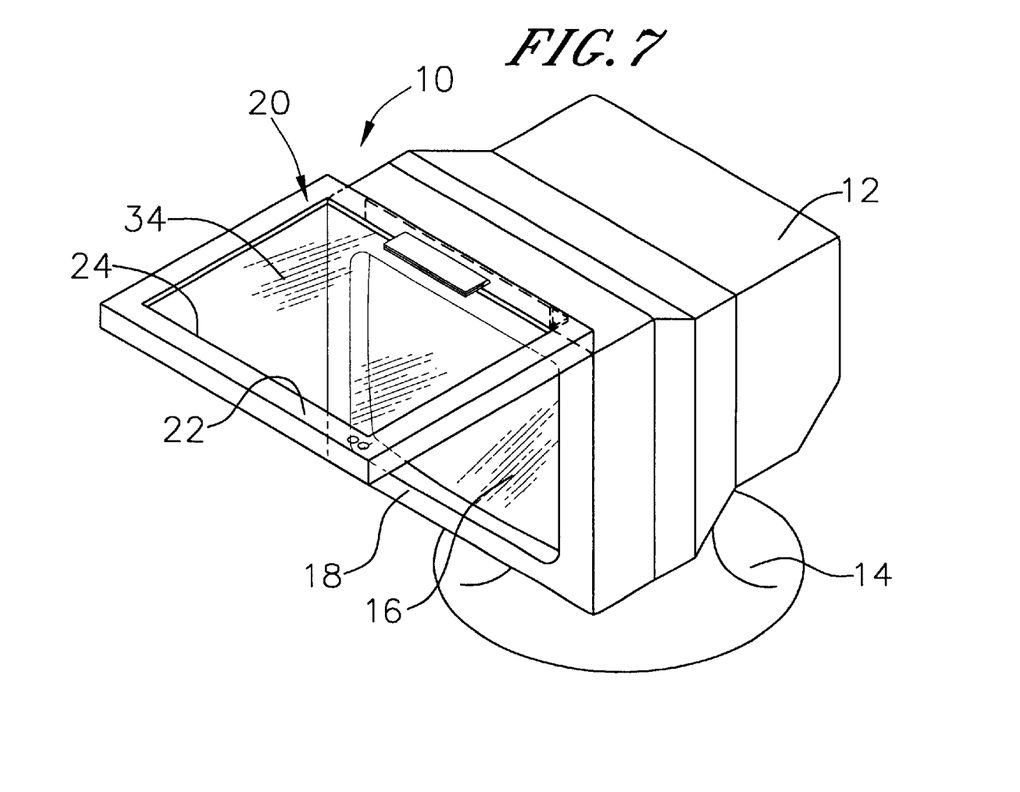
FIG. 7 is a perspective view of the scanner illustrated in FIG. 1 in an upwardly pivoted orientation.

The exemplary scanner 10 may be secured to the monitor 12 in a variety of ways, both permanent and temporary. The scanner 10 and monitor 12 may even be combined into an integral unit. As shown by way of example in FIGS. 1 and 7, the scanner 10 may be pivotably secured to the monitor 12 with a hinge 76. The hinge 76 allows the scanner to be pivoted upwardly from the generally vertical orientation illustrated in FIG. 1, to the generally horizontal orientation illustrated in FIG. 7, and beyond if desired. Image bearing substrates and three-dimensional objects may be placed on top of the glass 34 when the scanner 10 is horizontally oriented. The hinge 76 should have sufficient internal friction to support the weight of the scanner 10 and objects supported thereon. Alternatively, a mechanical locking mechanism could be provided to hold the scanner 10 in the orientation illustrated in FIG. 7.

Figure 8:
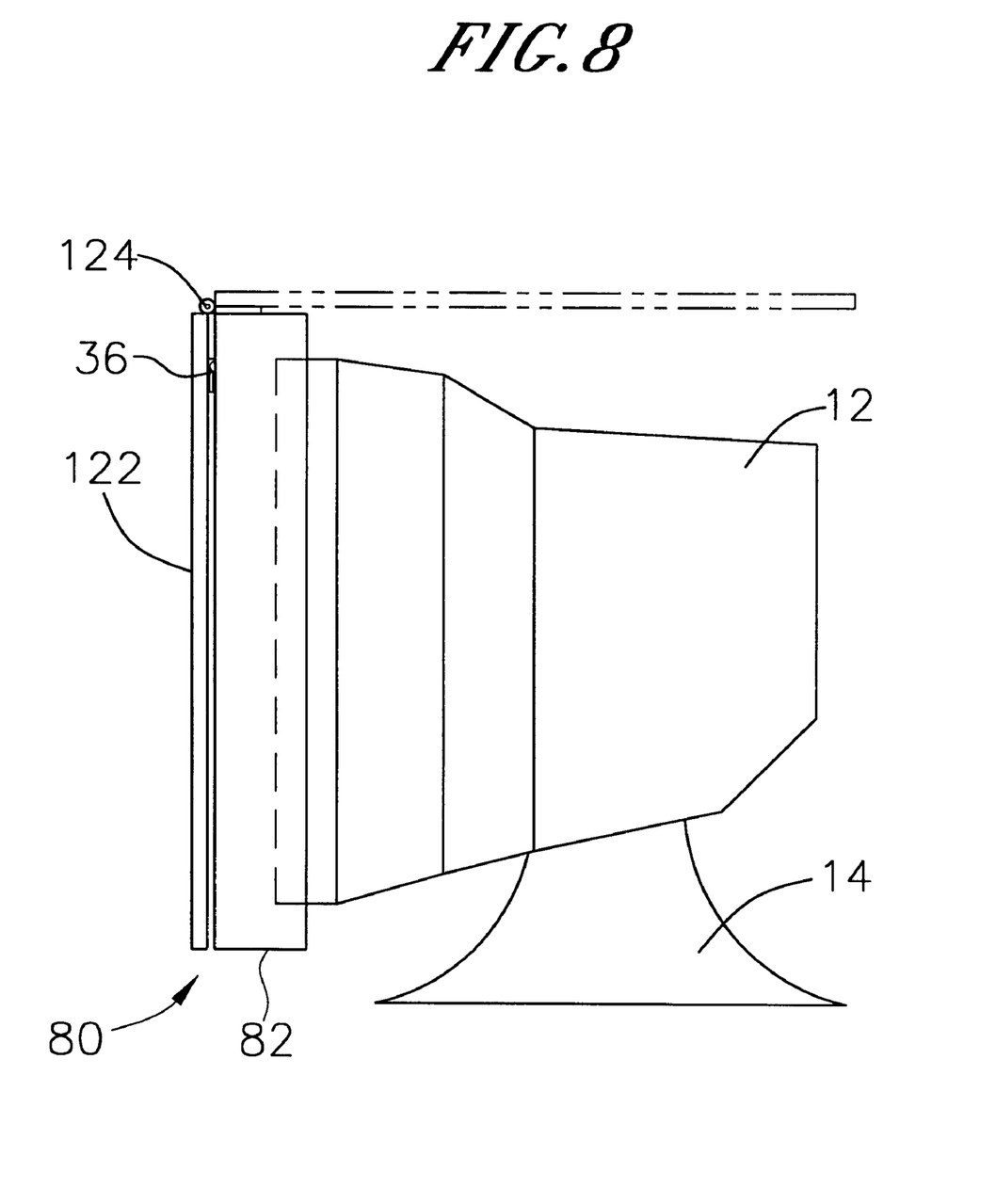
FIG. 8 is a side view of a scanner in accordance with a preferred embodiment of a present invention mounted over the front of a monitor.

Turning to FIG. 8, an exemplary scanner 80 may be provided with a housing 82 that is larger than the monitor 12. Thus, the scanner 80, which is otherwise similar to the scanner 10, can be mounted over the front of the monitor 12 in the manner illustrated in FIG. 8.

Figure 9A:
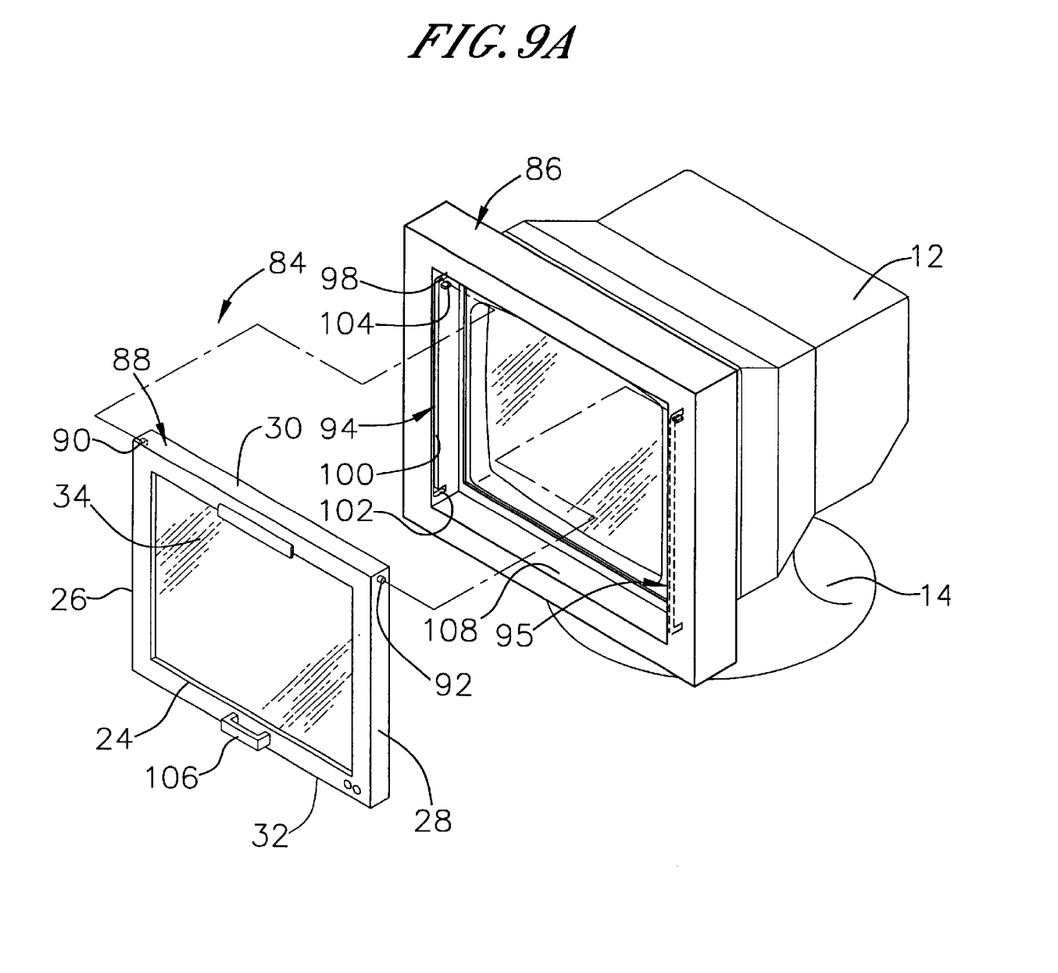
FIG. 9A is a partially exploded perspective view of a scanner in accordance with a preferred embodiment of a present invention.
Figure 9B:
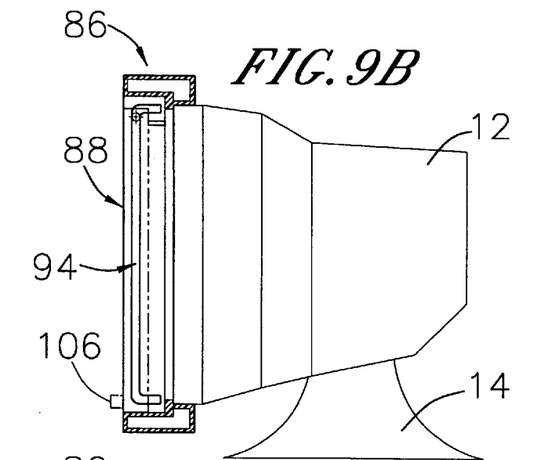
FIGS. 9B–9D are side section views of the preferred embodiment illustrated in FIG. 9A in various orientations.
Figure 9C:
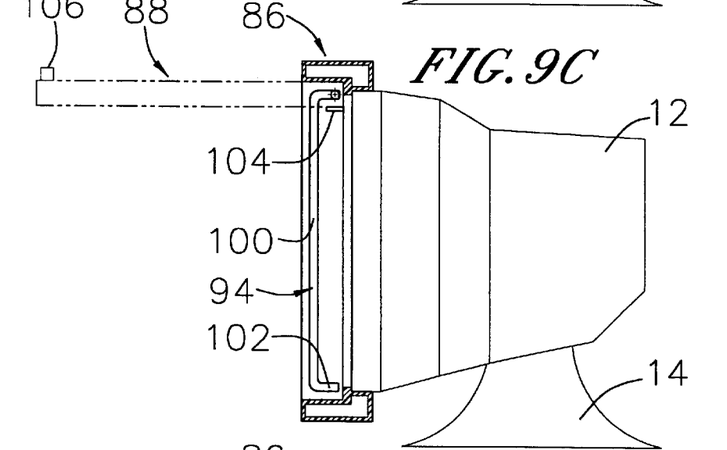
Figure 9D:
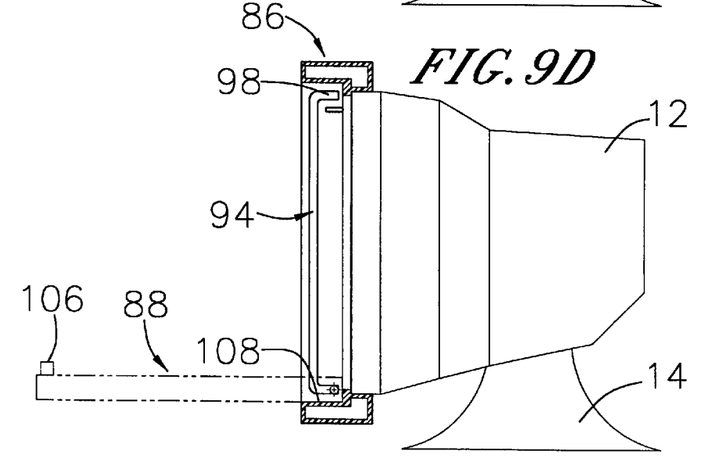

As illustrated for example in FIGS. 9A–9D, a scanner 84 in accordance with another preferred embodiment includes an outer housing 86 that can be mounted over the front of a monitor in the manner illustrated in FIG. 8 and also includes an inner housing 88. The scanning components are located within the inner housing 88. A pair of pins 90 and 92, which extend outwardly from the sides of the inner housing near the top, ride within slots 94 and 96 on the inner side 96 of the outer housing 86. The slots 94 and 96 include a top horizontal portion 98, a vertical portion 100, and a bottom horizontal portion 102. If desired, the inner housing 88 can be pivoted upwardly from the position shown in FIG. 9B and pushed back such that it rests in a horizontal orientation on shelves 104 that are located below the top horizontal portion 98 of each slot (FIG. 9C). A handle 106 is provided for this purpose. Alternatively, as illustrated in FIG. 9D, the inner housing 88 can be pivoted upwardly from the position shown in FIG. 9B, slid down the vertical slot portion 100, and pushed back such that it rests in a horizontal orientation on a portion 108 of the outer housing 86.

Power is supplied to the scanning components in the inner housing 88 through electrical connectors in the pins 90 and 92. The outer housing 86 includes corresponding connectors that mate with the connectors in the pins 90 and 92. Preferably, the outer housing 86 includes three sets of connectors located such that they will mate with the connectors in the pins 90 and 92 when the inner housing 88 in each of the three positions discussed above. Data connections may also be made via connectors in the pins 90 and 92. Suitable power and data cables will be provided to connect the outer housing 86 to a power source and a computer.

Scanners in accordance with inventions herein may also be mounted on, or supported by, objects other than monitors. A scanner 109 may be mounted on a wall 110 of a cubical 112 with a pair of hooks 114, as shown in FIG. 10. The scanner 109 may also be secured to the wall 110 with a hinge in the manner illustrated in FIGS. 1 and 7, and with other devices such as, for example hook and loop fastening tape.

The wall mounted scanner illustrated in FIG. 10 is battery operated and, hence, there is no power cord. Of course, a wall mounted scanner could include a power cord if so desired. As noted above, the scanner 109 makes a data connection with the CPU in the computer chassis 31 by way of the infrared transmitter 27 and the infrared receiver 29.

Figure 11:
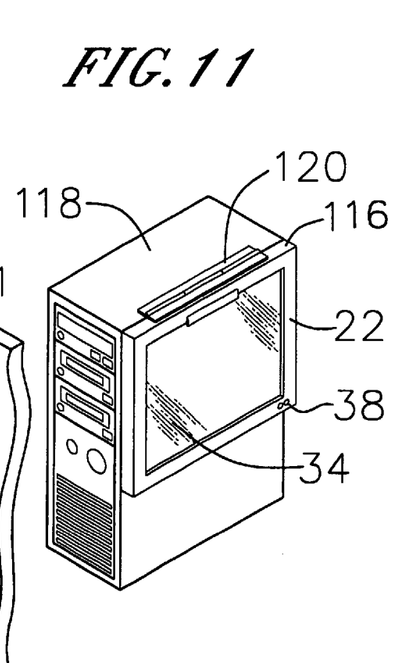
FIG. 11 is a perspective view of a scanner in accordance with a preferred embodiment of a present invention mounted on a computer chassis.

A scanner 116 may also be mounted on a computer chassis 118 with a hinge 120, as illustrated for example in FIG. 11, and with hooks such as those illustrated in FIG. 9. It should be noted that when a scanner 116 is intended to only be mounted on an object without a viewing screen, such as a wall or computer chassis, the rear or the housing 20 may be closed with an openingless wall.

Referring to FIG. 8, a cover 122 may be pivotably mounted on the scanner housing 82 with a hinge 124. A similar cover and hinge arrangement may also be provided on the exemplary scanner 10. The cover 122, which is especially useful for flattening wrinkled paper that is held by the clip 36, may be pivoted to the orientation shown in dashed lines when not in use. Alternatively, the hinge 124 could be located on the side of the housing 82 so that the cover 122 will pivot to the side when not in use. The cover 122 may also be temporarily secured to the front of a scanner housing with hooks similar to those illustrated in FIG. 11.

Although the present invention has been described in terms of the preferred embodiment above, numerous modifications and/or additions to the above-described preferred embodiments would be readily apparent to one skilled in the art. It is intended that the scope of the present invention extends to all such modifications and/or additions.

I claim:

1. A scanner, comprising:
   a housing adapted to be mounted on a monitor and defining a front housing opening and a rear housing opening, the front and rear housing openings together defining a substantially unobstructed view path through the housing; and
   a scanner module located within the housing and movable between a first position outside the view path and a second position within the view path and aligned with the front opening.

2. A scanner as claimed in claim 1, further comprising:
   a drive mechanism located within the housing operably connected to the scanner module.

3. A scanner as claimed in claim 2, wherein the scanner module includes first and second longitudinal ends and the drive mechanism includes first and second belts respectively associated with the first and second longitudinal ends of the scanner module.

4. A scanner as claimed in claim 1, further comprising:
   a sheet of substantially transparent material secured to the housing and associated with the front housing opening.

5. A scanner as claimed in claim 1, further comprising:
   a cover associated with the housing and adapted to cover at least a portion of the front housing opening.

6. A scanner as claimed in claim 1, wherein the housing includes a bracket that secures the housing to the monitor in a substantially vertical orientation.

7. A scanner as claimed in claim 6, wherein the bracket includes a pivotable member.

8. A scanner as claimed in claim 1, further comprising:
   an image bearing substrate holder adapted to secure an image bearing substrate to the scanner.

9. A scanner as claimed in claim 1, further comprising:
an object support associated with the housing and extending outwardly therefrom.

10. A scanner as claimed in claim 9, wherein the object support is slidable relative to the housing.

11. An apparatus, comprising:
a monitor including a monitor housing defining a screen opening and a monitor screen associated with the screen opening; and
a scanner mounted to the monitor, the scanner including a scanner housing defining a front housing opening and a rear housing opening, the front and rear housing openings together defining a substantially unobstructed view of the monitor screen through the housing, and a scanner module located within the scanner housing and movable between a first position outside the view path and a second position within the view path and aligned with the front housing opening.

12. An apparatus as claimed in claim 11, wherein the scanner is pivotably secured to the monitor housing.

13. An apparatus as claimed in claim 11, wherein the scanner is removably secured to the monitor housing.

14. An apparatus as claimed in claim 11, wherein the front housing opening is centrally disposed.

15. An apparatus as claimed in claim 11, wherein the screen opening and front housing opening define respective lengths and widths, the respective lengths of the screen opening and front housing opening are substantially equal, and the respective widths of the screen opening and front housing opening are substantially equal.

16. An apparatus as claimed in claim 11, wherein the scanner includes a drive mechanism located within the housing operably connected to the scanner module.

17. An apparatus as claimed in claim 16, wherein the scanner module includes first and second longitudinal ends and the drive mechanism includes first and second belts respectively associated with the first and second longitudinal ends of the scanner module.

18. An apparatus as claimed in claim 11, wherein the monitor housing defines a screen side having an outer perimeter, the scanner housing defines an outer perimeter, and the outer perimeter of the monitor housing screen side substantially corresponds to the outer perimeter of the scanner housing.

19. A system for use on a support surface, comprising:
an electrical device supported on the support surface and extending vertically from the support surface;
a scanner mounted to the electrical device in a vertically extending orientation to facilitate providing a substantially unobstructed platform surface in an area of the support surface adjacent the electrical device, the scanner including a scanner housing defining a front housing opening and a scanner module located within the housing and movable between a first position in spaced relation to the front housing opening and a second position aligned with the front housing opening.

20. A system as claimed in claim 19, wherein the electrical device comprises a monitor having a screen and the scanner housing defines a rear housing opening, the front and rear housing openings together providing a substantially unobstructed view of the monitor screen, the system further comprising:
a processor unit operably connected to the monitor and the scanner.

21. A monitor mountable scanner, comprising:
a scanner housing mountable to the monitor and having a centrally disposed opening, said opening being sufficiently large to provide a user with an unobstructed view of the monitor screen;
a mounting arrangement coupled to said housing to support in a stationary manner at about said centrally disposed opening a printed medium;
a scanning module concealingly mounted to said housing to facilitate the unobstructed view of the monitor when in a non operating mode, and further mounted to said housing for rectilinear movement across said centrally disposed opening when in an operating mode to facilitate converting illuminated indicia on the printed medium into an electrical signal indicative of the illuminated indicia.

22. A monitor mountable scanner, the monitor having a monitor screen for illuminating a document held in close proximity thereto, comprising:
a housing mountable to the monitor and having a centrally disposed opening, said opening being sufficiently large to provide a user with an unobstructed view of the monitor screen;
a mounting arrangement coupled to said housing to support in a stationary manner at about said centrally disposed opening a printed medium;
a non illuminated scanning module concealing mounted to said housing to facilitate the unobstructed view of the monitor in a non operating mode, and further mounted to said housing for rectilinear movement across said centrally disposed opening in an operating mode to facilitate converting monitor illuminated indicia on the printed medium into an electrical signal indicative of the illuminated indicia.

23. A scanning system, comprising:
a processor for processing image data;
a monitor having a viewing screen for displaying image data;
a scanner housing mountable to one of the processor and the monitor to facilitate providing an unobstructed user surface in an area about said processor and said monitor, said scanner housing having a centrally disposed opening sufficiently large to provide a user with an unobstructed view of the viewing screen when said housing is mounted to said monitor;
a mounting arrangement coupled to said housing to support in a stationary manner at about said centrally disposed opening a printed medium;
a scanning module coupled electrically to said processor and said monitor and concealingly mounted to said housing to facilitate the unobstructed view of the viewing screen when in a non operating mode, and further mounted to said housing for rectilinear movement across said centrally disposed opening when in an operating mode to illuminate said printed medium and for facilitating the converting of illuminated indicia on the printed medium into an electrical signal indicative of image data coupled to said processor.

24. A scanning system, comprising:
an electrical device supported from below on a platform surface;
a scanner housing removably mountable to said electrical device and mountable in a vertical orientation to a stationary surface in immediate proximity to said electrical device to facilitate providing a substantially unobstructed platform surface area at about said electrical device;
said scanner housing having a centrally disposed opening for receiving there about a printed medium; and a scanning module having an operating mode and a non operating mode, said scanning module being coupled electrically to said electrical device and mounted to said housing for rectilinear movement beneath said printed medium at about said centrally disposed opening to illuminate said printed medium and to facilitate the converting of illuminated indicia on the printed medium into an electrical signal indicative of image data coupled to said electrical device when in an operating mode;

said scanning module being further concealingly mounted to said housing to facilitate the unobstructed view of the printed medium when in a non operating mode.

* * * * *